United States Patent
Sugihara et al.

(10) Patent No.: US 10,275,528 B2
(45) Date of Patent: Apr. 30, 2019

(54) INFORMATION PROCESSING FOR DISTRIBUTED DISPLAY OF SEARCH RESULT

(71) Applicant: SONY CORPORATION, Tokyo (JP)

(72) Inventors: Kenji Sugihara, Nagano (JP); Yasutaka Fujii, Nagano (JP); Kentaro Maruyama, Nagano (JP); Keisuke Tanaka, Chiba (JP); Fumitaka Ozaki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 341 days.

(21) Appl. No.: 14/563,729

(22) Filed: Dec. 8, 2014

(65) Prior Publication Data

US 2015/0169766 A1    Jun. 18, 2015

(30) Foreign Application Priority Data

Dec. 13, 2013  (JP) ................. 2013-257918

(51) Int. Cl.
*G06F 17/30* (2006.01)
*G06F 3/0488* (2013.01)
*G06F 3/0481* (2013.01)
*G06F 3/0484* (2013.01)

(52) U.S. Cl.
CPC ...... *G06F 17/30864* (2013.01); *G06F 3/0488* (2013.01); *G06F 3/04817* (2013.01); *G06F 3/04842* (2013.01)

(58) Field of Classification Search
CPC ................................. G06F 17/30864
See application file for complete search history.

(56) References Cited

U.S. PATENT DOCUMENTS

| 2006/0195428 | A1* | 8/2006 | Peckover | G06F 17/3064 |
| 2007/0027857 | A1* | 2/2007 | Deng | G06F 17/30905 |
| 2012/0005626 | A1* | 1/2012 | Wong | G06F 17/30967 715/823 |

FOREIGN PATENT DOCUMENTS

| JP | 2012-226713 A | 11/2012 |
| JP | 2013-069165 A | 4/2013 |

* cited by examiner

*Primary Examiner* — Hung Q Pham
(74) *Attorney, Agent, or Firm* — Chip Law Group

(57) ABSTRACT

An information processing apparatus includes a display control unit which displays information in a first display state of the information processing apparatus itself and displays a search result obtained by using at least a part of the information as a search key in a second display state of another information processing apparatus of a different type from the information processing apparatus itself.

9 Claims, 16 Drawing Sheets

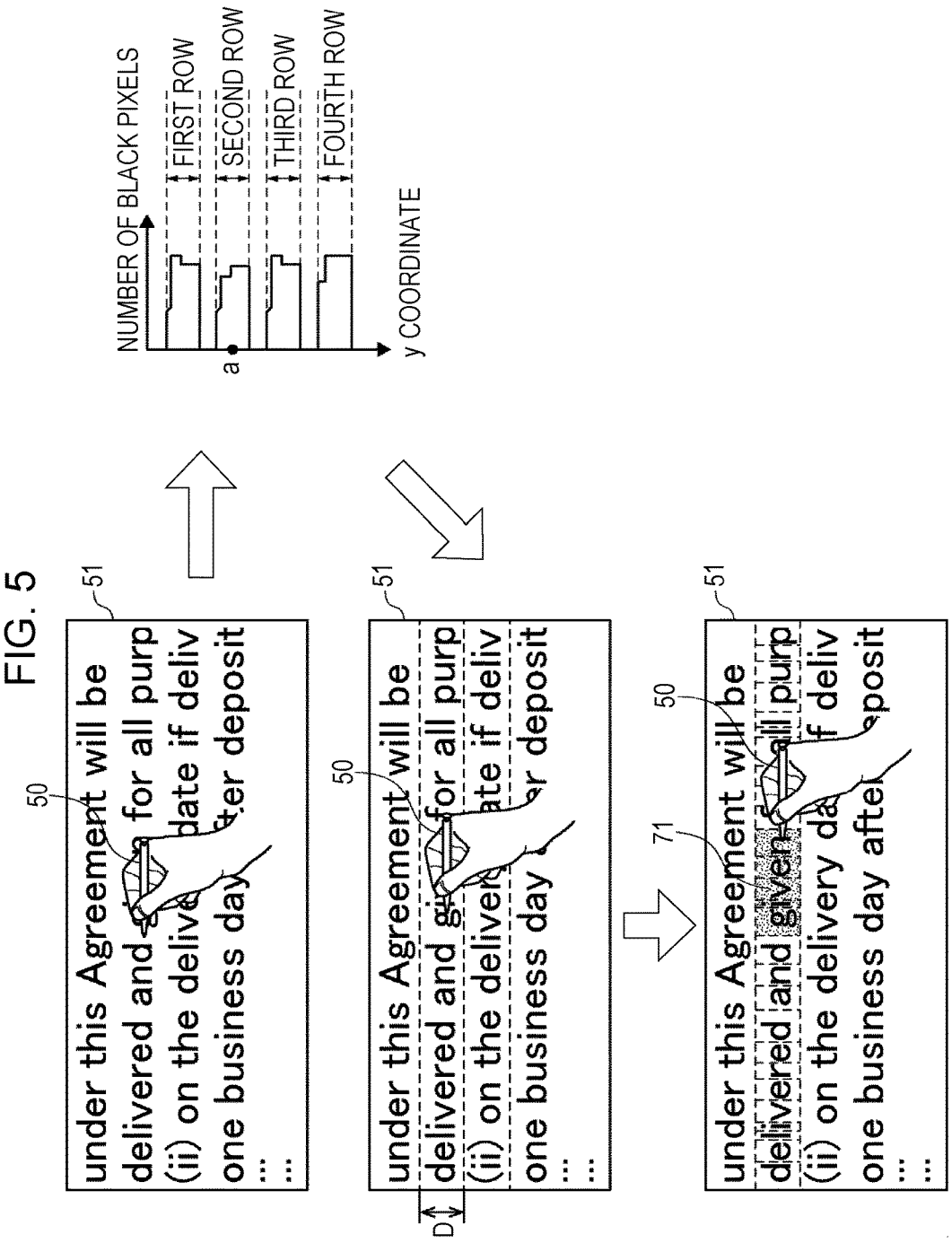

FIG. 18

```
                              71
under this Agreement will be
delivered and given for all purp
(ii) on the delivery date if deliv
one business day after deposit
...
...
```

301

INFORMATION PROCESSING FOR DISTRIBUTED DISPLAY OF SEARCH RESULT

CROSS REFERENCE TO RELATED APPLICATIONS

This application claims the benefit of Japanese Priority Patent Application JP 2013-257918 filed Dec. 13, 2013, the entire contents of which are incorporated herein by reference.

BACKGROUND

The present disclosure relates to an information processing apparatus, an information processing method, and a program, and particularly to an information processing apparatus, an information processing method, and a program which enable display of a search result in an easily viewable manner.

In recent years, an information processing apparatus provided with a pop-up dictionary function has been distributed. According to such an information processing apparatus, at least a part of information being displayed is made to function as a search key, searching is performed from a search target such as a web page or a dictionary, and a search result is displayed in a pop-up manner.

Accordingly, there is a requirement for searching during execution of an application other than a specific application such as a plug-in of a web browser and a requirement for using an originally created file, for example, other than the web page and the dictionary as a search target. In a case where the information processing apparatus is a tablet terminal, there is a requirement for designating the search key by using a pen or the like.

In contrast, there is an information processing apparatus which determines a dominant arm and performs display in accordance with the dominant arm (see Japanese Unexamined Patent Application Publication Nos. 2012-226713 and 2013-69165, for example).

SUMMARY

Incidentally, pop-up display by a pop-up dictionary function is performed in a display state of an information processing apparatus which executes the pop-up dictionary function. Therefore, information including the search key and a search result are displayed in the same display state, and the search result is not easily viewable. It is desirable to enable display of the search result in an easily viewable manner.

According to an embodiment of the present disclosure, there is provided an information processing apparatus including: a display control unit which displays information in a first display state of the information processing apparatus itself and displays a search result obtained by using at least a part of the information as a search key in a second display state of another information processing apparatus of a different type from the information processing apparatus itself.

An information processing method and a program according to embodiments of the present disclosure correspond to the information processing apparatus according to the embodiment of the present disclosure.

According to the embodiments, information is displayed in a first display state of the information processing apparatus itself, and a search result obtained by using at least a part of the information as a search key is displayed in a second display state of another information processing apparatus of a different type from the information processing apparatus itself.

According to the embodiments of the present disclosure, it is possible to display the search result. In addition, according to the embodiments of the present disclosure, it is possible to display the search result in an easily viewable manner.

However, the present disclosure is not limited to the effects described herein, and any of the effects described in the present disclosure may be achieved.

BRIEF DESCRIPTION OF THE DRAWINGS

FIG. 5 is a diagram illustrating an acquisition method of text data of information in the region designated by the region designating method in FIG. 4B;

FIG. 18 is a diagram showing a display example of a floating icon.

DETAILED DESCRIPTION OF EMBODIMENTS

Embodiment

Configuration Example of Embodiment of Information Processing System

Figure 1:
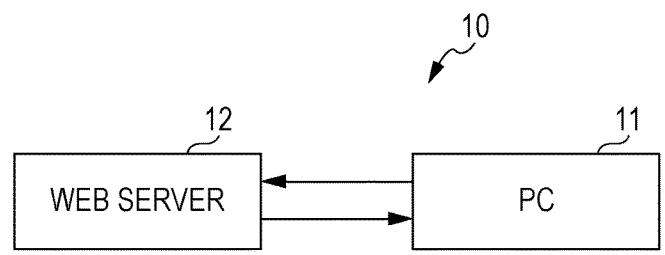
FIG. 1 is a block diagram showing a configuration example of an embodiment of an information processing system to which the present disclosure is applied.

FIG. 1 is a block diagram showing a configuration example of an embodiment of an information processing system to which the present disclosure is applied.

An information processing system 10 in FIG. 1 includes a personal computer (PC) 11 as an information processing apparatus and a web server 12. The PC 11 is designed to search a web page by using at least a part of information included in a screen being displayed on the PC 11 as a search key.

Specifically, the PC 11 in the information processing system 10 displays a screen in a PC display state in response to an instruction from a user. The PC 11 acquires, as a search key, text data of at least a part of information included in the screen being displayed, in response to an instruction from the user. The PC 11 provides the web server 12 with a request to perform searching by using acquired text data as a search key for a smart phone which is an information processing apparatus of a different type from the PC 11. The PC 11 receives a search result for display on the smart phone, which is transmitted from the web server 12, superimposes the search result on the screen being displayed, and performs pop-up display of the screen in a smart phone display state.

The web server 12 maintains a web page for display on a PC and a web page for display on a smart phone. The web server 12 searches a web page relating to the search key for the display on the smart phone or page information such as a uniform resource locator (URL) for specifying a web page relating to the search key, in response to a search request from the PC 11.

That is, when there is a search request from the PC 11 via a browser, the web server 12 searches a web page relating to the search key for the display on the smart phone. In contrast, if the search request from the PC 11 is made via an application programming interface (API), the web server 12 searches page information for the display on the smart phone. The web server 12 transmits a list of web pages or page information in a search order (hereinafter, referred to as a page list) as a search result to the PC 11.

In addition, the search order is an order from a search result with a higher rate at which the search result is requested. In a case where the search key is a name of a fruit and a rate at which a home page of a company whose name is the name of the fruit is requested as a search result is expected to be higher than a rate at which a web page explaining the fruit is requested, a search order of the homepage of the company whose name is the name of the fruit is higher than a search order of the web page explaining the fruit.

Configuration Example of Hardware in PC

Figure 2:
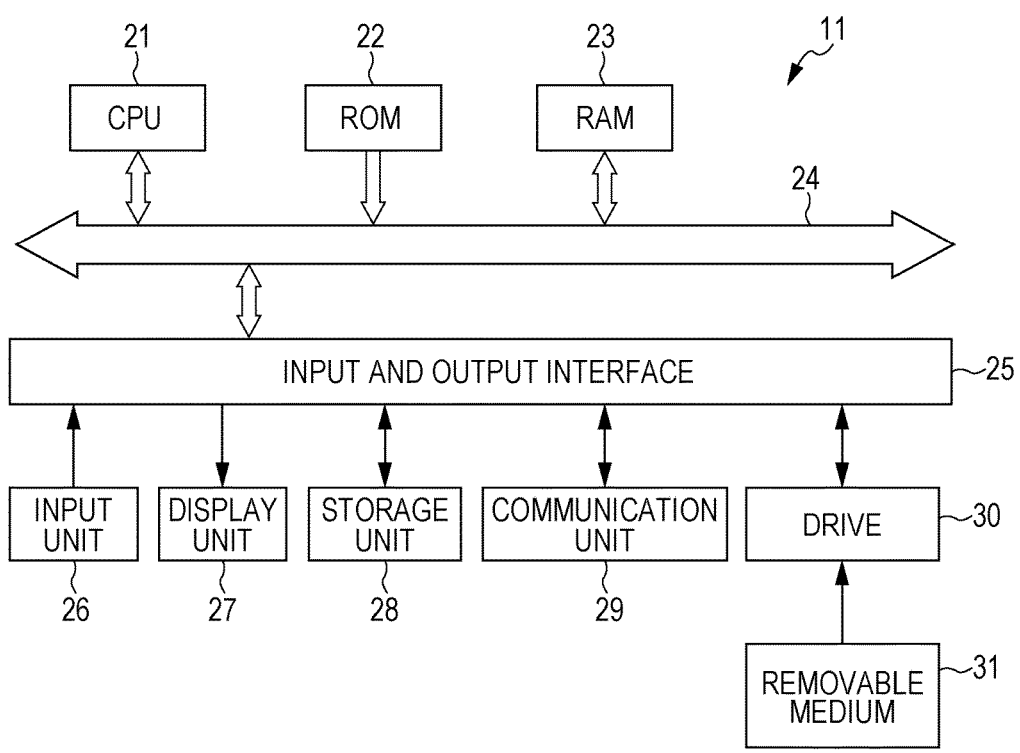
FIG. 2 is a block diagram showing a configuration example of hardware in a PC.

FIG. 2 is a block diagram showing a configuration example of hardware in the PC 11 in FIG. 1.

In the PC 11, a central processing unit (CPU) 21, a read only memory (ROM) 22, and a random access memory (RAM) 23 are connected to each other by a bus 24.

An input and output interface 25 is further connected to the bus 24. An input unit 26, a display unit 27, a storage unit 28, a communication unit 29, and a drive 30 are connected to the input and output interface 25.

The input unit 26 includes a sensor unit of a touch panel, a keyboard (including a touch pad), and a mouse. The input unit 26 receives an operation of the user and supplies an operation signal corresponding to the operation to the CPU 21. The display unit 27 includes a liquid crystal panel or the like. In a case where the input unit 26 is a sensor unit of a touch panel, the input unit 26 and the display unit 27 configure the touch panel. The storage unit 28 includes a hard disk, a non-volatile memory, or the like and stores various kinds of information.

The communication unit 29 includes a network interface or the like and communicates with an external device such as a web server 12. The drive 30 drives a removable medium 31 such as a magnetic disk, an optical disc, a magneto-optical disc, or a semiconductor memory.

The PC 11 configured as described above performs various kinds of processing by the CPU 21 loading a program stored on the storage unit 28, for example, into the RAM 23 via the input and output interface 25 and the bus 24 and executing the program.

For example, the CPU 21 functions as a search display processing unit which executes a predetermined application stored on the storage unit 28 to cause the display unit 27 to display a screen in a PC display state and search a web page by using at least a part of information included in the screen as a search key. Examples of the predetermined application include an application, document creation software, and table calculation software for displaying scan data or image data of a web page, text data, e-mail data, handwritten letter data, and magazines.

The program executed by the CPU 21 can be recorded and provided in a removable medium 31 as a package medium, for example. In addition, the program can be provided via a wired or a wireless transmission medium such as a local area network, the Internet, or digital satellite broadcasting.

The PC 11 can install the program on the storage unit 28 via the input and output interface 25 by mounting the removable medium 31 on the drive 30. In addition, the program can be received by the communication unit 29 via a wired or a wireless transmission medium and be installed on the storage unit 28. Moreover, the program can be installed on the ROM 22 or the storage unit 28 in advance.

Functional Configuration Example of PC

Figure 3:
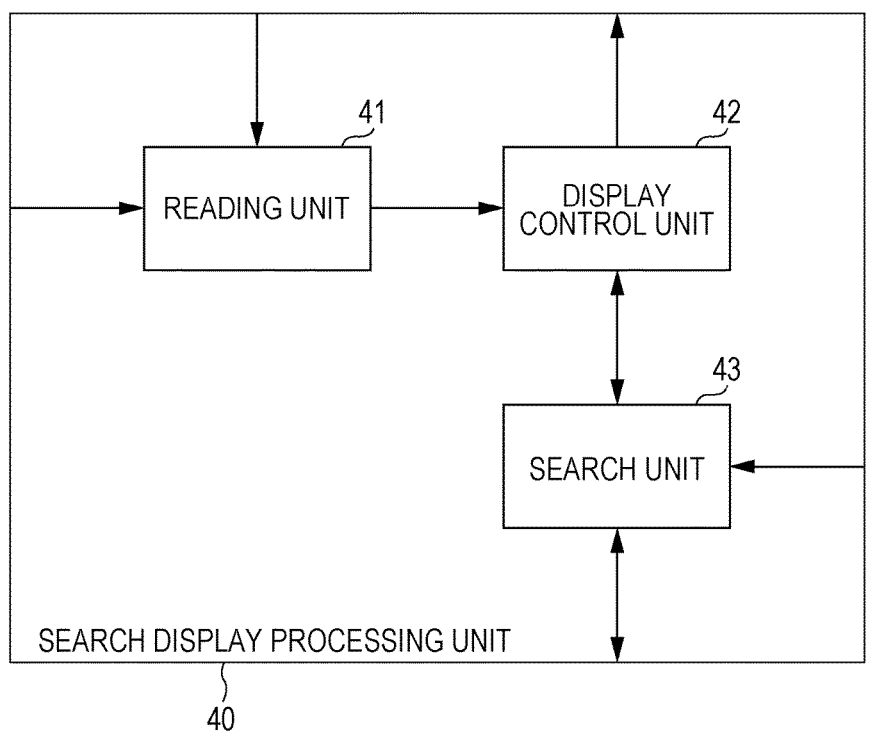
FIG. 3 is a block diagram showing a configuration example of a search display processing unit.

FIG. 3 is a block diagram showing a configuration example of a search display processing unit implemented by the CPU 21.

A search display processing unit 40 in FIG. 3 includes a reading unit 41, a display control unit 42, and a search unit 43.

The reading unit 41 of the search display processing unit 40 in FIG. 3 reads information from the storage unit 28 in response to the operation signal supplied from the input unit 26. The reading unit 41 supplies the read information to the display control unit 42.

The display control unit 42 causes the display unit 27 to display a screen in the PC display state based on the information supplied from the reading unit 41. In addition, the display control unit 42 extracts text data of information in a region or at a position designated by the user from the information included in the screen being displayed in response to the request from the search unit 43 and supplies the text data to the search unit 43. At this time, the display control unit 42 causes the display unit 27 to display adjustment buttons for adjusting the search key with respect to the information in the screen corresponding to the extracted text data.

The display control unit 42 causes the display unit 27 to superimpose a web page for the display on the smart phone, for example, supplied from the search unit 43 on the screen being displayed in the PC display state and perform pop-up display in the smart phone display state. By such an operation, the screen for the display on the PC and the web page for the display on the smart phone are displayed on the display unit 27.

The search unit 43 provides the display control unit 42 with a request to supply the text data of the information in the region or at the position, which is designated by the user, in the screen in response to the operation signal supplied from the input unit 26. The search unit 43 acquires, as a search key, the text data supplied from the display control unit 42 in response to the request. In addition, the search unit 43 provides the web server 12 via the communication unit 29 with a request to perform searching by using the acquired search key as a smart phone. That is, the search unit 43 performs the searching by using the acquired search key as a smart phone.

The search unit 43 supplies the search result for the display on the smart phone, which is transmitted from the web server 12 via the communication unit 29 in response to the request, to the display control unit 42. In a case where the search result is a page list, the search unit 43 provides the web server 12 via the communication unit 29 with a request to acquire a web page of the highest search order among web pages specified in the search result. The search unit 43 supplies the web page for the display on the smart phone, which is transmitted from the web server 12 via the communication unit 29 in response to the request, to the display control unit 42.

Description of Region Designating Method by User

Figure 4A:
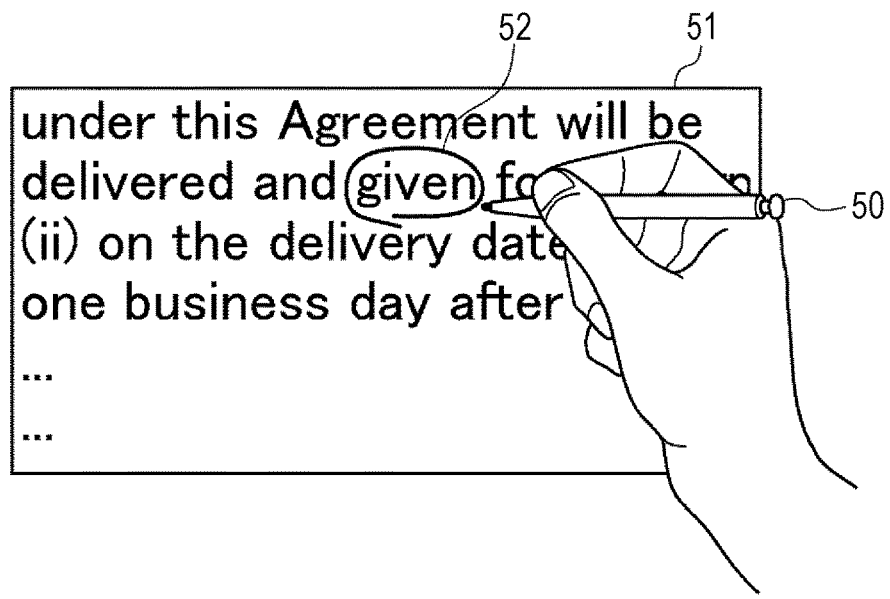
FIGS. 4A and 4B are diagrams illustrating a region designating method by a user.
Figure 4B:

FIGS. 4A and 4B are diagrams illustrating a region designating method by the user.

In a case where the input unit 26 is a sensor unit of a touch panel, the user can designate a region in a circle 52 by depicting the circle 52 on the screen 51 for the display on the PC, which is being displayed on the display unit 27 with the input unit 26 superimposed thereon, by using a touch pen 50, for example, as shown in FIG. 4A. In this case, the user can designate a search key in the same manner as in a case of writing a mark on a paper.

In a case where the input unit 26 is the sensor unit of the touch panel, the user can designate a region from a start point to an end point of moving (dragging) the touch pen 50, for example, by moving the touch pen 50 in a state of being in contact with the input unit 26 in the screen 51 as shown in FIG. 4B. In this case, the user can easily designate a range in small units (in units of a letter, for example).

In case where the input unit 26 is a sensor portion or a mouse, the user can designate a region by rectangular selection though not shown in the drawing.

Description of Acquisition Method of Text Data of Information in Designated Region FIG. 5 is a diagram illustrating an acquisition method of text data of information in the region designated by the region designating method in FIG. 4B. Referring to FIG. 5, a case where the information in the screen 51 is image data will be described.

In this case, the display control unit 42 accumulates the number of black pixels in the screen 51 in a horizontal direction (x direction) first. By such an operation, a position (y coordinate) of each row in a vertical direction (y direction) on the screen 51 is detected as shown in a right upper part of the drawing. Therefore, the display control unit 42 can recognize a row of a start point of the designated region based on the y coordinate of the start point and the y coordinate of each row on the screen 51. In the example in FIG. 5, a left side of "g" of "given" on the second row corresponds to the start point of the designated region, the y coordinate of the start point is a, and therefore, the display control unit 42 recognizes that the row of the start point is the second row.

Next, the display control unit 42 accumulates the number of black pixels in a region D of the y coordinate of the second row, on which the start point is present, on the screen 51 in the vertical direction. By such an operation, a position (x coordinate) of each column on the second row in the x direction is detected. Therefore, the display control unit 42 can recognize the column of the start point of the designated region based on the x coordinate of the start point and the x coordinate of each column on the second row. In the example in FIG. 5, the left side of "g" of "given" on the second row corresponds to the start point of the designated region, and therefore, the display control unit 42 recognizes that the column of the start point is the thirteenth column. Therefore, the display control unit 42 starts a marker 71, which has a width corresponding to the position of the second row in the vertical direction and represents the search key, from the left post side of the position on the second row and the thirteenth column in the horizontal direction.

Then, the display control unit 42 recognizes a row and a column on which the end point is present, in the same manner as the start point. In the example of FIG. 5, the right side of "n" of "given" on the second row corresponds to the end point of the designated region, and therefore, the display control unit 42 recognizes that the end point is on the second row and the seventeenth column. Therefore, the display control unit 42 completes the marker 71 at the rightmost side of the position on the second row and the seventeenth column in the horizontal direction. Then, the display control unit 42 acquires the text data of the image data within the range from the second row and the thirteenth column to the second row and the seventeenth column in the screen.

In the case where the information in the screen 51 is image data, the display control unit 42 recognizes rows and columns of a start point and an end point and acquires text data within a range from the row and the column of the start point to the row and the column of the end point as described above. Therefore, the user can designate the region by an operation similar to that in a case where the information in the screen 51 is text data.

In addition, the text data of the image data is acquired in advance by using optical character recognition (OCR). The OCR is activated when the user operates a side button of the touch pen 50, for example.

Description of Position Designating Method by User

Figure 6A:
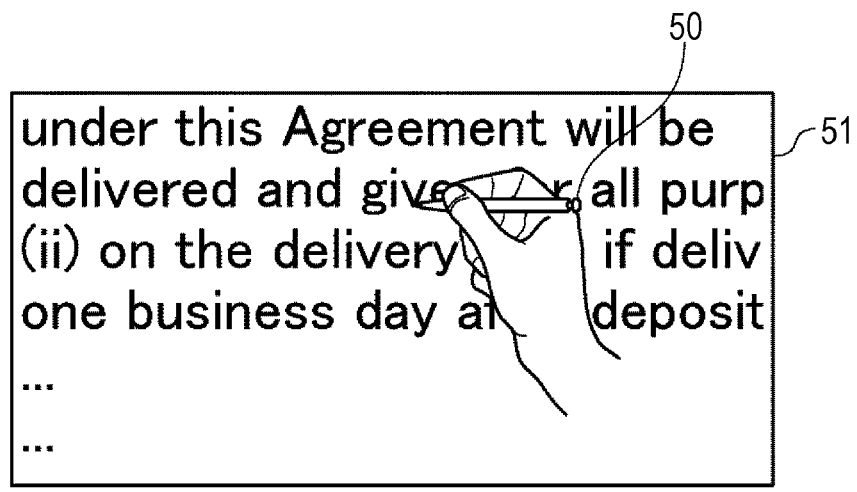
FIGS. 6A and 6B are diagrams illustrating a position designating method by the user.
Figure 6B:
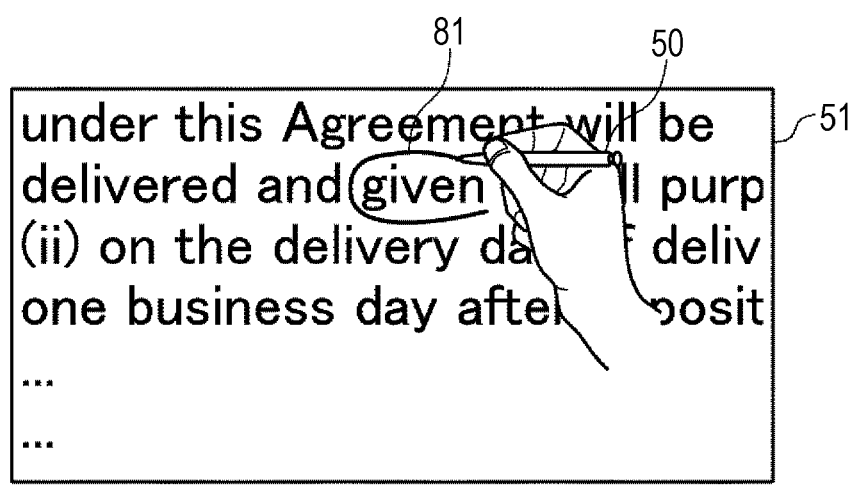

FIGS. 6A and 6B are diagrams illustrating a position designating method by the user.

In the case where the input unit 26 is the sensor unit of the touch panel, the user can designate a contact position by bringing the touch pen 50 into contact with (touch) the input unit 26 in the screen 51 while pressing a side button, which is not shown in the drawing, of the touch pen 50, for example, as shown in FIG. 6A.

In the case where the input unit 26 is the keyboard and the mouse, the user can designate a click operation position by performing a click operation with the mouse on the screen 51 while pressing an accessory key provided on the keyboard.

In the case where the input unit 26 is the sensor unit of the touch pane and the user performs an operation with their finger, the user can designate the contact position by bringing a finger into contact with the input unit 26 in the screen 51 while pressing a position, which corresponds to the accessory key being displayed on the display unit 27, of the input unit 26 with another finger. In this case, a configuration in which the user can designate the contact position by performing a specific gesture (touching with three fingers, for example) on the input unit 26 and then bringing their finger into contact with the input unit 26 in the screen 51 is also applicable.

In the case where the input unit 26 is the sensor unit of the touch panel, the user can designate a center position of a region in a circle 81 by depicting the circle 81 on the input unit 26 in the screen 51 while pressing the side button, which is not shown in the drawing, of the touch pen 50, for example, as shown in FIG. 6B.

Display Example of Adjustment Button

Figure 7:
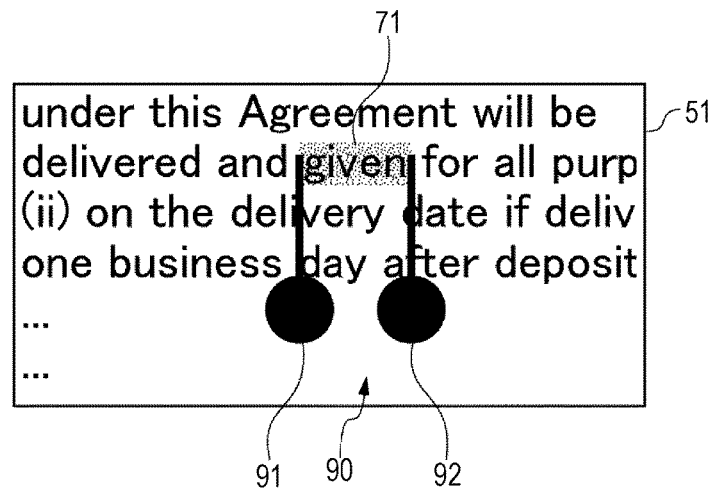
FIG. 7 is a diagram showing a display example of an adjustment button.

FIG. 7 is a diagram showing a display example of an adjustment button.

As shown in FIG. 7, an adjustment button 90 includes a start point adjustment button 91 and an end point adjustment button 92. The start point adjustment button 91 is displayed at a start point of information in the screen 51, which corresponds to the text data extracted by the display control unit 42, namely at a start point of the search key, and the end point adjustment button 92 is displayed at an end point of the search key.

In FIG. 7, for example, the information in the screen 51, which corresponds to the text data extracted by the display control unit 42, is "given", and therefore, the start point adjustment button 91 is displayed on the left side of "g" as the start point, and the end point adjustment button 92 is displayed on the right side of "n" as the end point.

The user can change the start point of the search key by operating the input unit 26 and vertically and horizontally moving the start point adjustment button 91. In addition, the user can change the end point of the search key by operating the input unit 26 and vertically and horizontally moving the end point adjustment button 92.

First Display Example of Search Result

FIGS. 8 to 12 are diagrams showing a first display example of the search result.

Figure 8:
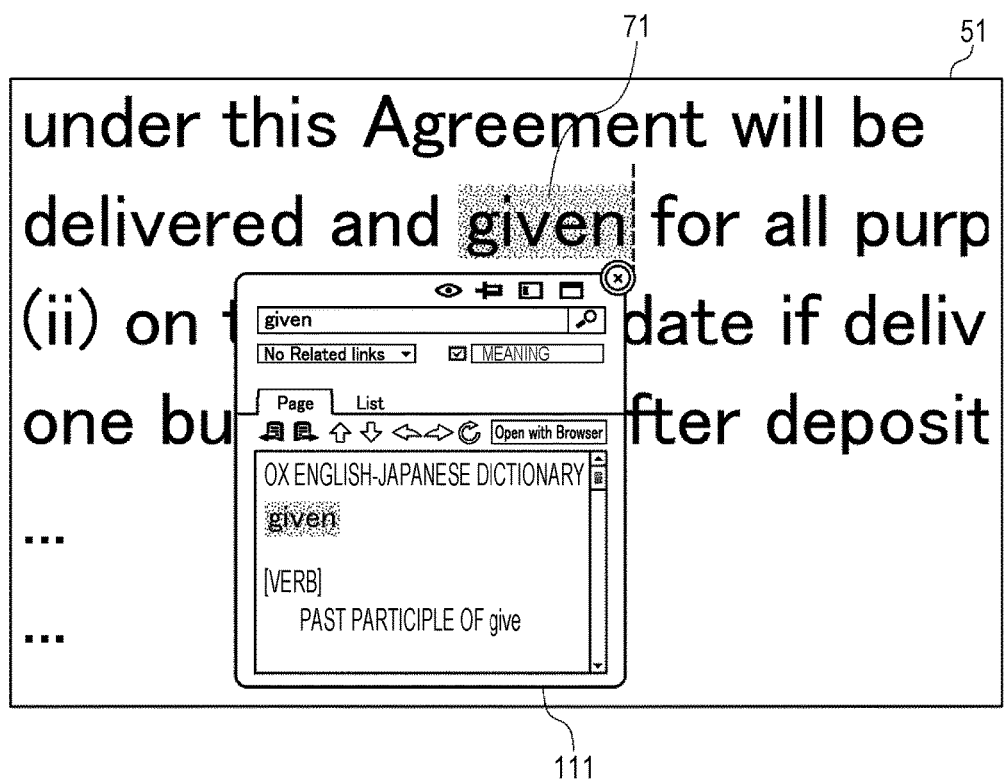
FIG. 8 is a diagram showing a first display example of a search result.

As shown in FIG. 8, a pop-up screen 111 for displaying the search result for the display on the smart phone is superimposed and displayed on the screen 51 for the display on the PC. Here, the pop-up screen 111 is superimposed immediately below the search key such that the position of the end point of the search key, to which a marker 71 is attached, in the horizontal direction in the screen 51 coincides with the position of the right end of the pop-up screen 111 in the horizontal direction.

In addition, the display position of the pop-up screen 111 is not limited thereto. For example, the display position of the pop-up screen 111 can be differentiated in accordance with a region designating method. In this case in which the region designating method is a method of dragging the screen from the right to the left, for example, the pop-up screen 111 is superimposed immediately below the search key such that the position of the end point of the search key in the horizontal direction in the screen 51 coincides with the position of the right end of the pop-up screen 111 in the horizontal direction.

In contrast, in a case where the region designating method is a method of dragging the screen from the left to the right, the pop-up screen 111 is superimposed immediately above the search key such that the position of the end point of the search key in the horizontal direction in the screen 51 coincides with the position of the right end of the pop-up screen 111 in the horizontal direction.

By changing the display position of the pop-up screen 111 in accordance with a direction of dragging as described above, it is possible to enhance visibility of the pop-up screen 111. That is, dragging from the right to the left is typically performed by a left-handed user, and dragging from the left to the right is typically performed by a right-handed user. In addition, a hand of the left-handed user is present on the left lower side of an operation target while a hand of the right-handed user is present on the right lower side of the operation target.

Therefore, in a case where the screen is dragged from the right to the left, it is possible to prevent the user's hand from hiding the search key during the operation of the pop-up screen 111, by displaying the pop-up screen 111 on the right lower side. In a case where the screen is dragged from the left to the right, it is possible to prevent the user's hand from hiding the pop-up screen 111 during the dragging, by displaying the pop-up screen 111 on the right upper side.

In addition, the display position of the pop-up screen 111 can be differentiated in accordance with a position designating method. In this case in which the position designating method is a method of touching the left side of the search key, the pop-up screen 111 is superimposed immediately below the search key such that the position of the start point of the search key in the horizontal direction in the screen 51 coincides with the position of the left end of the pop-up screen 111 in the horizontal direction. In contrast, in a case where the position designating method is a method of touching the right side of the search key, the pop-up screen 111 is superimposed immediately above the search key such that the position of the end point of the search key in the horizontal direction in the screen 51 coincides with the position of the right end of the pop-up screen 111 in the horizontal direction.

Since the pop-up screen 111 is displayed in a periphery of the search key as described above, the user can view both the pop-up screen 111 and the search key without greatly moving a visual line.

In a case where the pop-up screen 111 is not able to be entirely displayed on the display unit 27, a vertical relationship with the search key is inverted, or the position thereof in the vertical direction is made to coincide with the position of the search key such that the pop-up screen 111 can be entirely displayed. The pop-up screen 111 may not be displayed as a whole within the screen 51.

In addition, in a case where a display mode of the pop-up screen 111 is in a color automatic adjustment mode, a background color of the pop-up screen 111 is a color of letters in the marker 71, and a color of letters in the pop-up screen 111 is a color of the marker 71. In this case, the screen 51 and the pop-up screen 111 have similar colors, and therefore, it is possible to reduce stimulation to the optic nerve. In contrast, if the display mode of the pop-up screen 111 is not the color automatic adjustment mode, the colors of the letters and the background of the pop-up screen 111 are colors determined in advance (the color of the letters is black, and the color of the background is white, for example).

Although the size of the pop-up screen 111 is not particularly limited, the pop-up screen 111 has such a size that does not prevent visual recognition of the screen 51 and facilitates operation thereof.

Figure 9:
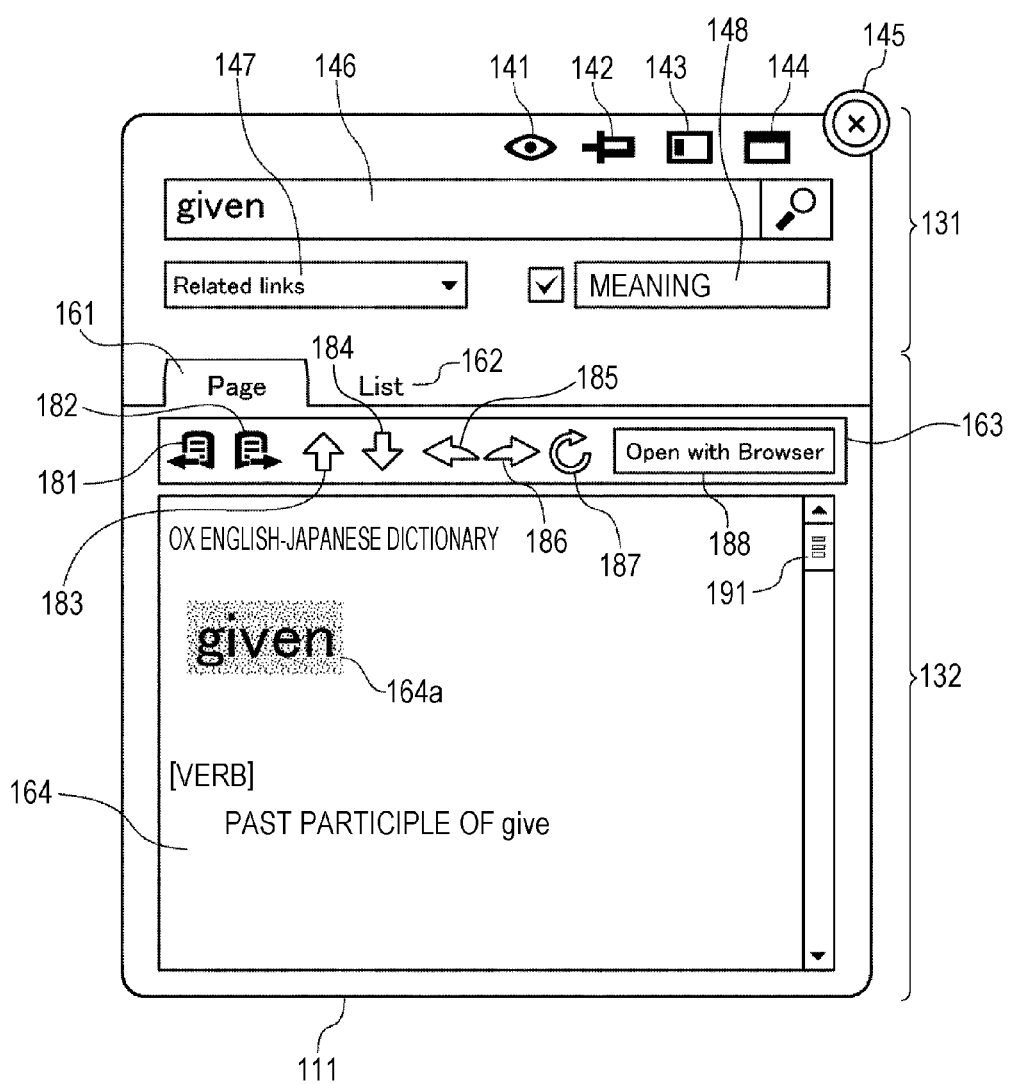
FIG. 9 is a diagram showing the first display example of the search result.

As shown in FIG. 9, the pop-up screen 111 includes a search key setting section 131 and a search result display section 132.

A non-display button 141, a pinning button 142, a side bar display button 143, a maximization button 144, and a close button 145 are displayed in order from the left side at a right upper portion in the search key setting section 131. The non-display button 141 is a button for not displaying the pop-up screen 111 temporarily during an operation. The pinning button 142 is a button for continuously displaying the pop-up screen 111 until the next operation.

The side bar display button 143 is a button which is operated for displaying the pop-up screen 111 as a side bar. The maximization button 144 is a button which is operated for maximizing the display of the pop-up screen 111. The close button 145 is operated for completing the display of the pop-up screen 111.

At a center upper portion of the search key setting section 131, a search key display section 146 is displayed. In the search key display section 146, a search key used for the search by the search unit 43 is displayed first. The user can change the search key by changing the search key displayed in the search key display section 146 by using the input unit 26.

Figure 10:
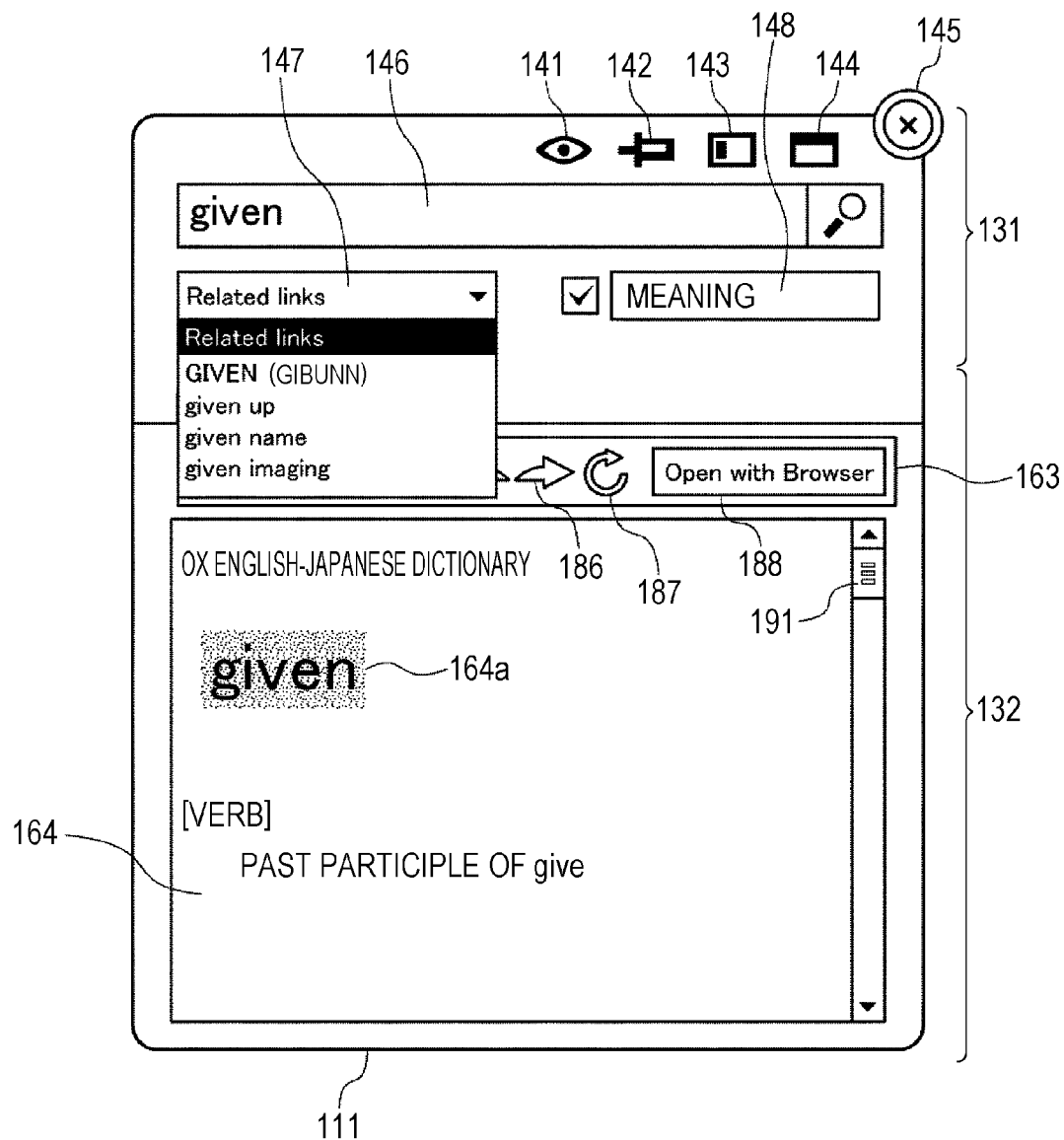
FIG. 10 is a diagram showing the first display example of the search result.

At a left lower portion of the search key setting section 131, a related word selecting section 147 is displayed. The related word selecting section 147 is operated when a word related to the search key is selected. Words related to the search key are displayed as shown in FIG. 10 if the user operates the related word selecting section 147, and the user can select a desired one from among the words. The thus the selected word is regarded as a new search key.

At a right lower portion of the search key setting section 131, a genre selecting section 148 which is operated when a genre of content of the search result is selected is also displayed as shown in FIG. 9. In the example of FIG. 9, "meaning" is selected as a genre in the genre selecting section 148, and a web page or a page list which shows the meaning of the search key is searched.

At a left upper portion of the search result display section 132, a page tab 161 and a list tab 162 are displayed. The page tab 161 is operated when the search result display section 132 is made to display a web page. The list tab 162 is operated when the search result display section 132 is made to display a screen based on a page list.

When the page tab 161 is operated, an operation section 163 is displayed at a center upper portion of the search result display section 132. In the operation section 163, an upper order button 181, a lower order button 182, a previous button 183, a next button 184, a backward button 185, a forward button 186, an update button 187, and a browser button 188 are displayed in order from the left.

The upper order button 181 is operated when a web page with a search order which is immediately above the search order of the web page being displayed in the page display section 164 is displayed. The lower order button 182 is operated when a web page with a search order which is immediately below the search order of the web page being displayed in the page display section 164 is displayed.

The previous button 183 is operated when a marker 164a is applied to a search key that appears before a search key, to which the marker 164a is currently applied, in the web page being displayed in the page display section 164. The next button 184 is operated when the marker 164a is applied to a search key that appears after the search key, to which the marker 164a is currently applied, in the web page being displayed in the page display section 164.

The backward button 185 is operated when the web page displayed in the page display section 164 is changed to a web page which was displayed immediately before the current web page. The forward button 186 is operated when the web page displayed in the page display section 164 is changed to a web page which was displayed immediately after the current web page.

The update button 187 is operated when the web page being displayed in the page display section 164 is updated. The browser button 188 is operated when the search result is displayed in a browser.

If the page tab 161 is operated, the page display section 164 is displayed at the center lower portion of the search result display section 132. In the page display section 164, a web page as a search result or a web page specified by page information with the highest search order among page information registered in a page list is displayed.

In the case where the search result is a page list as described above, the web page with the highest search order is displayed in the page display section 164, and therefore, the user can immediately view the web page with the highest possibility in that the web page is the most helpful.

The marker 164a is applied to a search key in the web page displayed in the page display section 164. The search key to which the marker 164a is applied is changed by using the previous button 183 or the next button 184. In a case where the size of the web page displayed in the page display section 164 exceeds the size of the page display section 164, a scroll bar 191 is displayed at a right end of the page display section 164. Then, a region corresponding to the size of the page display section 164, which includes the search key with the marker 164a applied thereto, in the web page is displayed in the page display section 164. Since the marker 164a is applied to the search key in the web page, the user can quickly and visually recognize the search key in the web page.

Figure 11:
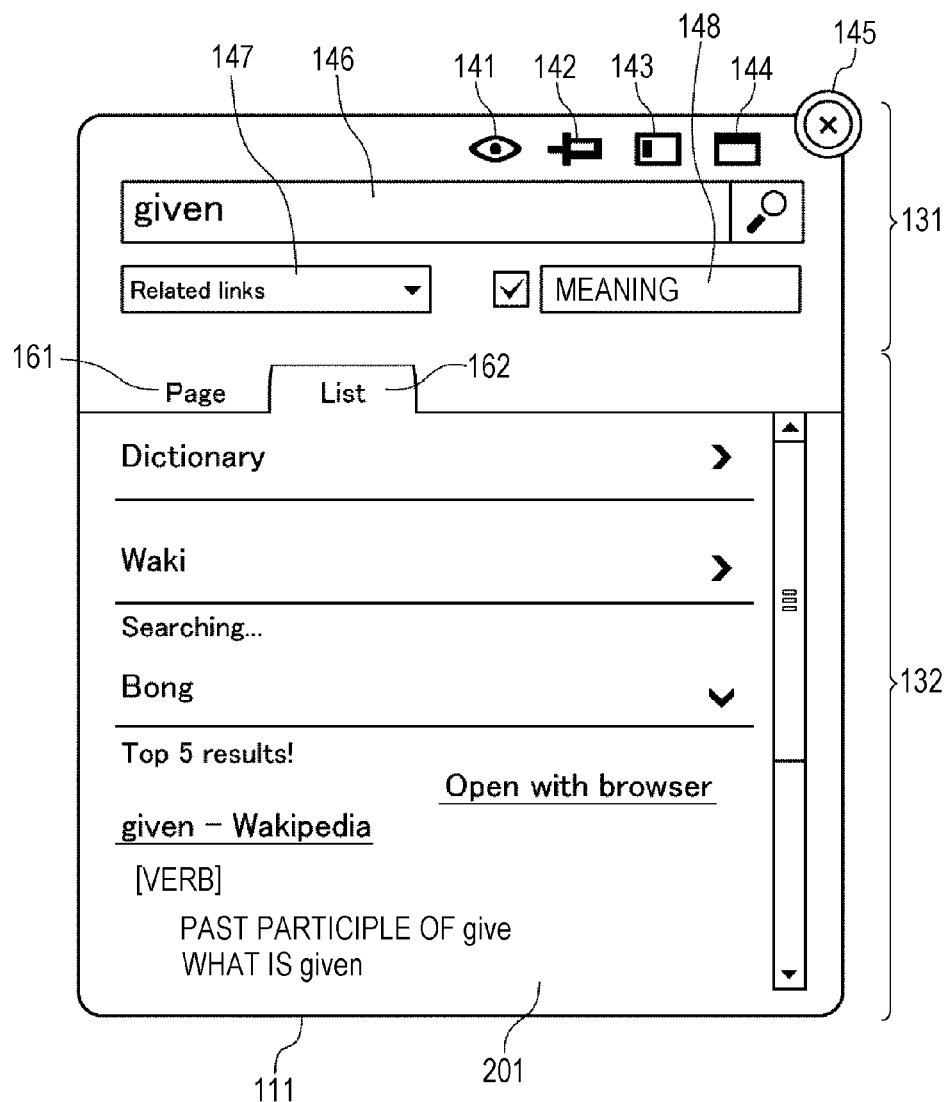
FIG. 11 is a diagram showing the first display example of the search result.

If the list tab 162 is operated, a list display section 201 is displayed at the center of the search result display section 132 as shown in FIG. 11. In the list display section 201, a list of categories of search results and information based on the page list are displayed.

In the example of FIG. 11, "Dictionary", "Waki", and "Bong" are displayed as categories of the search results. In the category "Dictionary", search results from a web page of a dictionary are classified. In the category "Waki", search results from a web page of Wakipedia are classified. In the category "Bong", search results from a search engine "bong" are classified. These categories can be changed or deleted in accordance with a user's operation on the input unit 26. In the example of FIG. 11, page information of five pages in order from the highest search order is displayed as information based on the page list.

Figure 12:
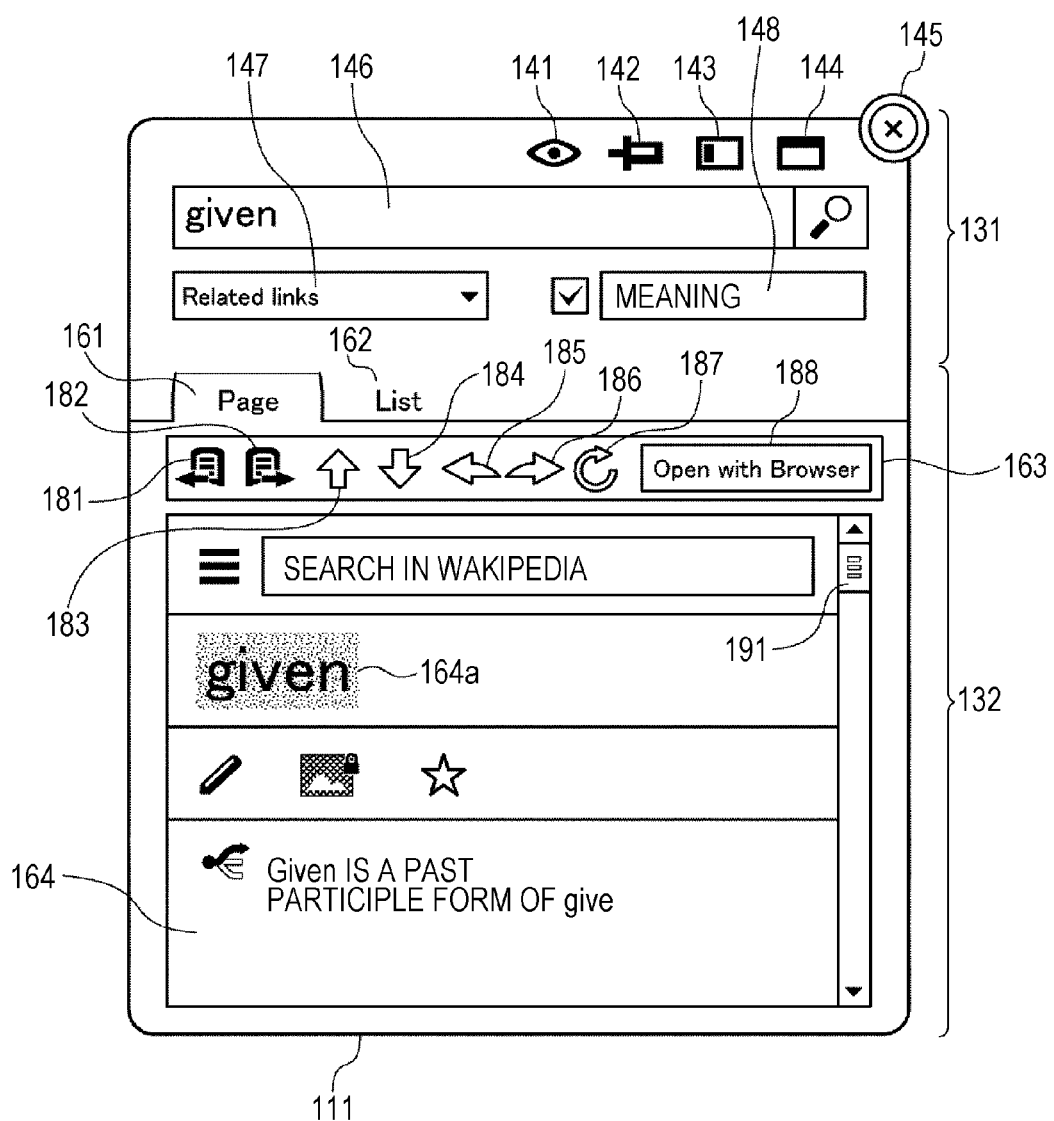
FIG. 12 is a diagram showing the first display example of the search result.

If a category displayed in the list display section 201 is selected by the user, a state where the list tab 162 is being selected is shifted to a state where the page tab 161 is being selected, and a web page classified into the category is displayed. For example, if the category "Waki" is selected in FIG. 11, the operation section 163 and the page display section 164 are displayed in the search result display section 132 as shown in FIG. 12. Then, the web page classified into the category "Waki" is displayed in the page display section 164.

In a case where page information being displayed in the list display section 201 is selected by the user, the state where the list tab 162 is being selected is shifted to the state where the page tab 161 is being selected, and a web page specified by the page information is displayed in the same manner.

Second Display Example of Search Result

Figure 13:
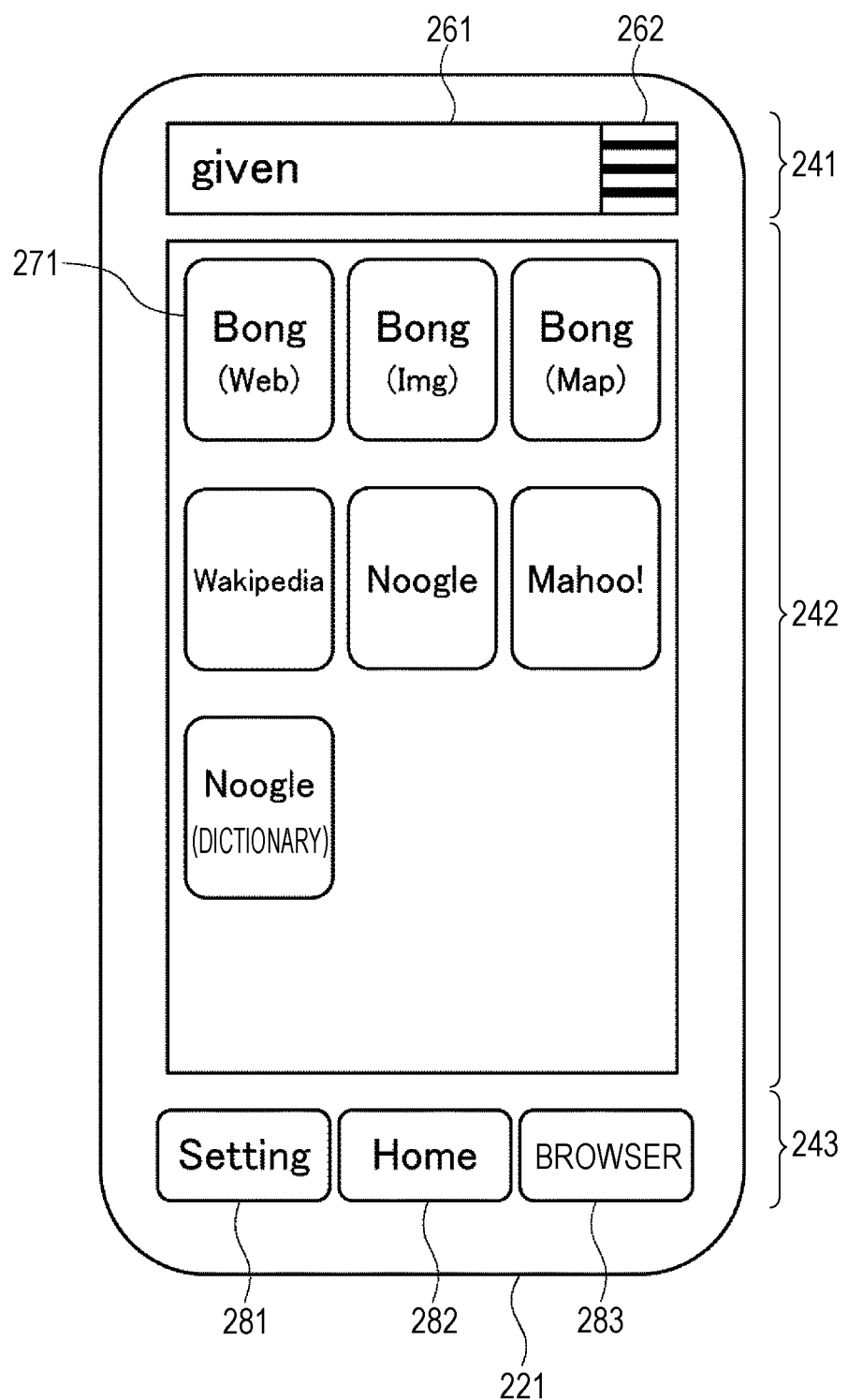
FIG. 13 is a diagram showing a second display example of the search result.
Figure 14:
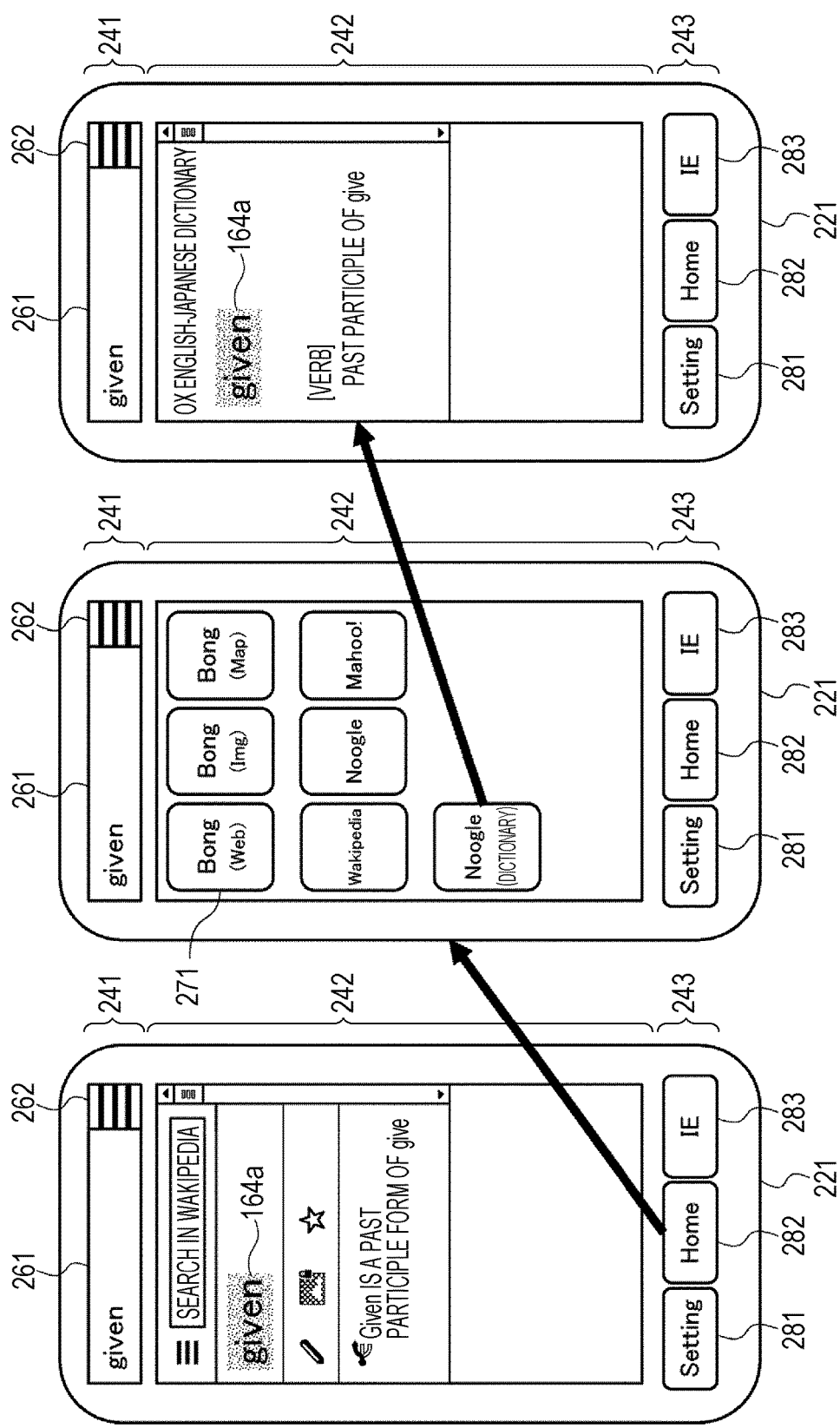
FIG. 14 is a diagram showing the second display example of the search result.

FIGS. 13 and 14 are diagrams showing a second display example of a pop-up screen which displays a search result for display on a smart phone.

A pop-up screen 221 in FIG. 13 includes a search key setting section 241, a display section 242, and an operation section 243. The pop-up screen 221 is superimposed and displayed on the screen 51 for the display on the PC in the same manner as the pop-up screen 111 in FIG. 8.

The search key setting section 241 in the pop-up screen 221 includes a search key display section 261 and a history display button 262. In the search key display section 261, a search key used for the search by the search unit 43 is displayed first. The user can change the search key by changing the search key displayed in the search key display section 261 by using the input unit 26.

The history display button 262 is operated when a history of search keys in the past is displayed in the search key display section 261. By operating the history display button 262 and selecting a desired search key from the displayed history of the search keys in the past, the user can set the search key as a search key again.

In the display section 242, a setting screen for various kinds of settings, a search result, search result category buttons 271, and the like are displayed. In a case where the size of the display section 242 is smaller than the size of the display target, a scroll bar which is not shown in the drawing is displayed at a right end.

As categories of search results, there are "Bong (web)", "Bong (Img)", "Bong (Map)", "Wakipedia", "Noogle", "Mahoo!", "Noogle (dictionary)" and the like as shown in FIG. 13. The buttons 271 are operated when a search result of a category corresponding to each button 271 is displayed.

The buttons 271 can be added or deleted by the user. The buttons 271 are added by downloading the buttons from a server, which is not shown in the drawing, via a network, for example. In addition, the buttons 271 can be newly created by the user. In such a case, the user can share the originally created buttons 271 with other users. In addition, the buttons 271 displayed in the display section 242 may be rearranged by the user.

The operation section 243 includes a setting button 281, a home button 282, and a browser button 283. The setting button 281 is operated when a setting screen is displayed in the display section 242. On the setting screen, it is possible to set usage or non-usage of the side button of the touch pen 50, ON and OFF of the color automatic adjustment mode, and the like. The home button 282 is operated when the buttons 271 are displayed in the display section 242. The browser button 283 is operated when a search result is displayed in a browser.

In the operation section 243, a transparent display button which is operated when the pop-up screen 221 is temporarily not displayed and a pinning button for continuously displaying the pop-up screen 221 until the next operation may be included. In the operation section 243, a side bar display button which is operated when the pop-up screen 221 is displayed as a side bar may be included.

In the pop-up screen 221 configured as described above, a search result ("Wakipedia" in the example of FIG. 14) of a predetermined category is displayed in the display section 242 first as shown on the left side in FIG. 14. If the home button 282 is operated at this time, the buttons 271 are displayed in the display section 242 as shown at the center of FIG. 14. Then, if the user operates a button 271 for a desired category ("Noogle (dictionary)" in the example of FIG. 14), a search result of the category is displayed in the display section 242 as shown on the right side in FIG. 14. In addition, the marker 164a is applied to the search key in the web page as the search result in the same manner as in the cases of FIGS. 8 to 12.

Description of Processing by PC

Figure 15:
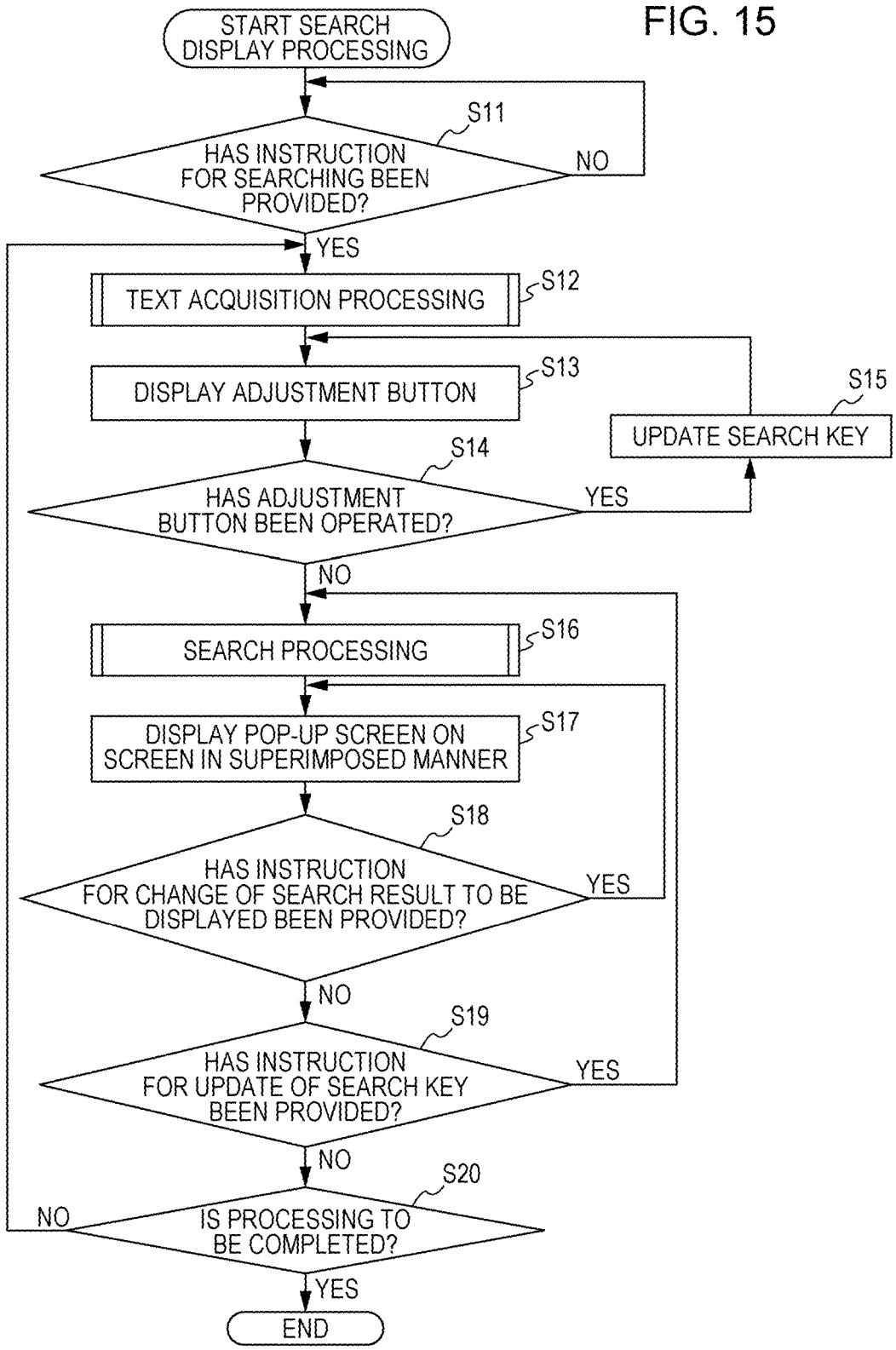
FIG. 15 is a flowchart illustrating search display processing of a search display processing unit.

FIG. 15 is a flowchart illustrating search display processing of the search display processing unit 40 in the PC 11. The search display processing is started when the screen 51 for the display on the PC is displayed, for example.

In Step S11, the search unit 43 in the search display processing unit 40 determines whether or not an instruction for searching has been provided by the user, in accordance with an operation signal supplied from the input unit 26. Specifically, if an operation signal corresponding to pressing of a specific key or a side button of the input unit 26, a specific touch gesture on the input unit 26, or the like is supplied from the input unit 26, the search unit 43 determines that the instruction for the searching has been provided by the user.

If it is determined in Step S11 that the instruction for the searching has not been provided by the user, the search unit 43 waits until an instruction of searching is provided. In contrast, if it is determined in Step S11 that the instruction for the searching is provided by the user, the search unit 43 provides the display control unit 42 with a request for text data of information in a region or at a position, which is designated by the user, in the screen and moves on to processing in Step S12.

In Step S12, the display control unit 42 performs text acquisition processing for acquiring text data as a search key. The text acquisition processing will be described with reference to FIG. 16 which will be described later.

In Step S13, the display control unit 42 displays the adjustment button 90 (FIG. 7) for the search key in the screen 51.

In Step S14, the display control unit 42 determines whether or not the adjustment button 90 has been operated by the user, in accordance with the operation signal supplied from the input unit 26. If it is determined in Step S14 that the adjustment button 90 has been operated, then the processing proceeds to Step S15.

In Step S15, the display control unit 42 updates the search key in accordance with the operation. Specifically, the display control unit 42 recognizes, as a newly designated region, a region from a position of the start point adjustment button 91 as a start point to a position of the end point adjustment button 92 as an end point and performs processing in Steps S42 and S43 in FIG. 16 which will be described later. Then, the processing returns to Step S13.

In contrast, if it is determined in Step S14 that the adjustment button 90 has not been operated, the display control unit 42 supplies the search key to the search unit 43 and moves on to processing in Step S16.

In Step S16, the search unit 43 performs search processing using the search key as a smart phone. Details of the search processing will be described with reference to FIG. 17 which will be described later.

In Step S17, the display control unit 42 creates the pop-up screen 111 (221) including the search result, which is supplied from the search unit 43 by the search processing in Step S16, in accordance with layout information maintained in advance and superimposes and displays the pop-up screen 111 (221) on the screen 51.

In Step S18, the display control unit 42 determines whether or not an instruction for changing the search result to be displayed in the pop-up screen 111 (221) has been provided by the user, in accordance with the operation signal supplied from the input unit 26. In a case where an operation of the list tab 162 in FIG. 9, selection of a category or page information in the list display section 201 in FIG. 11, selection of the button 271 after the operation of the home button 282 in FIG. 13, or the like is performed, for example, it is determined that the instruction for changing the search result to be displayed has been provided.

If it is determined in Step S18 that the instruction for changing the search result has been provided, the processing returns to Step S17, and the display control unit 42 superimposes and displays the pop-up screen 111 (221) including the search result, which is to be newly displayed, on the screen 51. Then, the processing proceeds to Step S18, and the processing in Step S18 is repeated.

In contrast, if it is determined in Step S18 that the instruction for changing the search result to be displayed has not been provided, the processing proceeds to Step S19.

In Step S19, the search unit 43 determines whether or not an instruction for updating the search key has been provided. In a case where an input to the search key display section 146 in FIG. 9, an operation of the related word selecting section 147, an input to the search key display section 261 in FIG. 13, or the like is performed, for example, it is determined that the instruction for updating the search key has been provided.

If it is determined in Step S19 that the instruction for updating the search key has been provided, the processing returns to Step S16, and the search processing using the search key after the updating is performed. Then, the processing proceeds to Step S17, and the processing in Steps S18 and S19 is repeated.

In contrast, if it is determined in Step S19 that the instruction for updating the search key has not been provided, then the processing proceeds to Step S20. In Step S20, the search unit 43 determines whether or not to complete the processing in accordance with the operation signal supplied from the input unit 26. Specifically, the search unit 43 determines completion of the processing in a case where an operation signal corresponding to pressing of a specific key or the side button of the input unit 26, a specific touch gesture on the input unit 26, or the like is supplied from the input unit 26.

If it is determined in Step S20 that the processing is not to be completed, the processing returns to Step S12, and the processing in Steps S12 to S20 is repeated until completion of the processing is determined in Step S20.

In contrast, if it is determined in Step S20 that the processing is to be completed, then the processing is completed.

Although the search key is updated in response to the operation of the adjustment button 90 in the search display processing in FIG. 15, the search key may be updated in response to some operation performed after the operation of the adjustment button 90.

Figure 16:
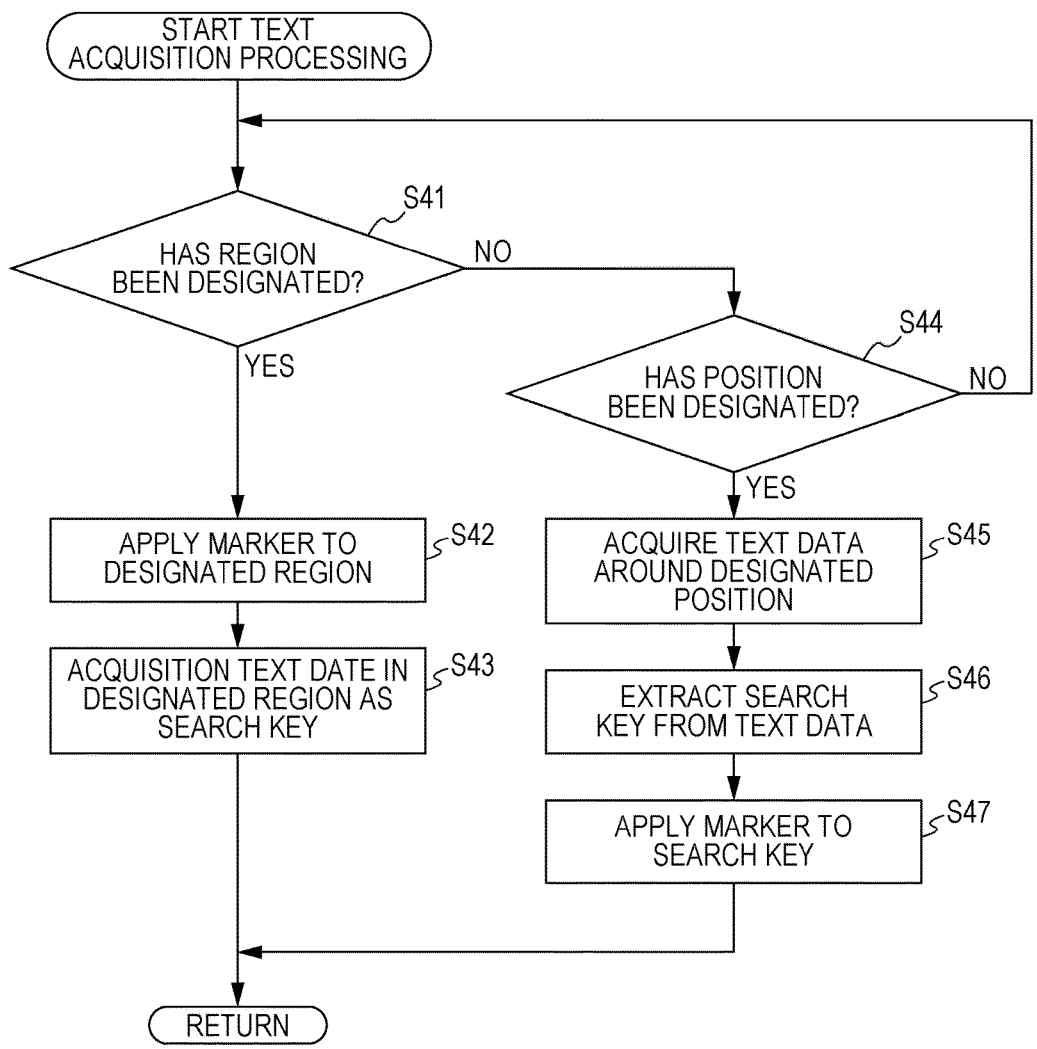
FIG. 16 is a flowchart illustrating details of text acquisition processing in FIG. 15.

FIG. 16 is a flowchart illustrating details of the text acquisition processing in Step S12 in FIG. 15.

In Step S41 in FIG. 16, the display control unit 42 determines whether or not a region has been designated by the user, in accordance with the operation signal. If it is determined in Step S41 that a region has been designated by the user, then the processing proceeds to Step S42.

In Step S42, the display control unit 42 applies the marker 71 to information in the designated region on the screen 51. In Step S43, the display control unit 42 acquires, as a search key, text data of the information in the designated region. The text data is acquired via a clipboard, an API, an OCR, or the like. Then, the processing returns to Step S12 in FIG. 15 and proceeds to Step S13.

In contrast, if it is determined in Step S41 that no region has been designated by the user, then the processing proceeds to Step S44. In Step S44, the display control unit 42 determines whether or not a position has been designated by the user, in accordance with the operation signal.

If it is determined in Step S44 that a position has been designated by the user, then the processing proceeds to Step S45. In Step S45, the display control unit 42 acquires text data in a periphery of the designated position in the screen 51 in accordance with the operation signal. The text data is acquired via an API, an OCR, or the like.

In Step S46, the display control unit 42 extracts the search key from the acquired text data. Examples of a search key extracting method include a method of performing matching with a dictionary by using a morphological analysis technique or the like and extracting an item with a high matching degree as a search key and a method of extracting a search key based on a switching point of letter types. According to the method of extracting the search key based on the switching point of letter types, a range surrounded by spaces is extracted as a search key in a case where the search key is English, or continuous katakana letters are extracted as a search key. The method of extracting a search key based on a switching point of letter types may be differentiated in accordance with a language of the acquired text data.

In Step S47, the display control unit 42 applies the marker 71 to the extracted search key. Then, the processing returns to Step S12 in FIG. 15 and proceeds to Step S13.

If it is determined in Step S44 that no position has been designated by the user, the processing returns to Step S41, and the processing in Steps S41 and S44 is performed until a region or a position is designated.

Although the designation of both the region and the position can be recognized in the embodiment, a configuration in which designation of any one of the region and the position can be recognized is also applicable.

Figure 17:
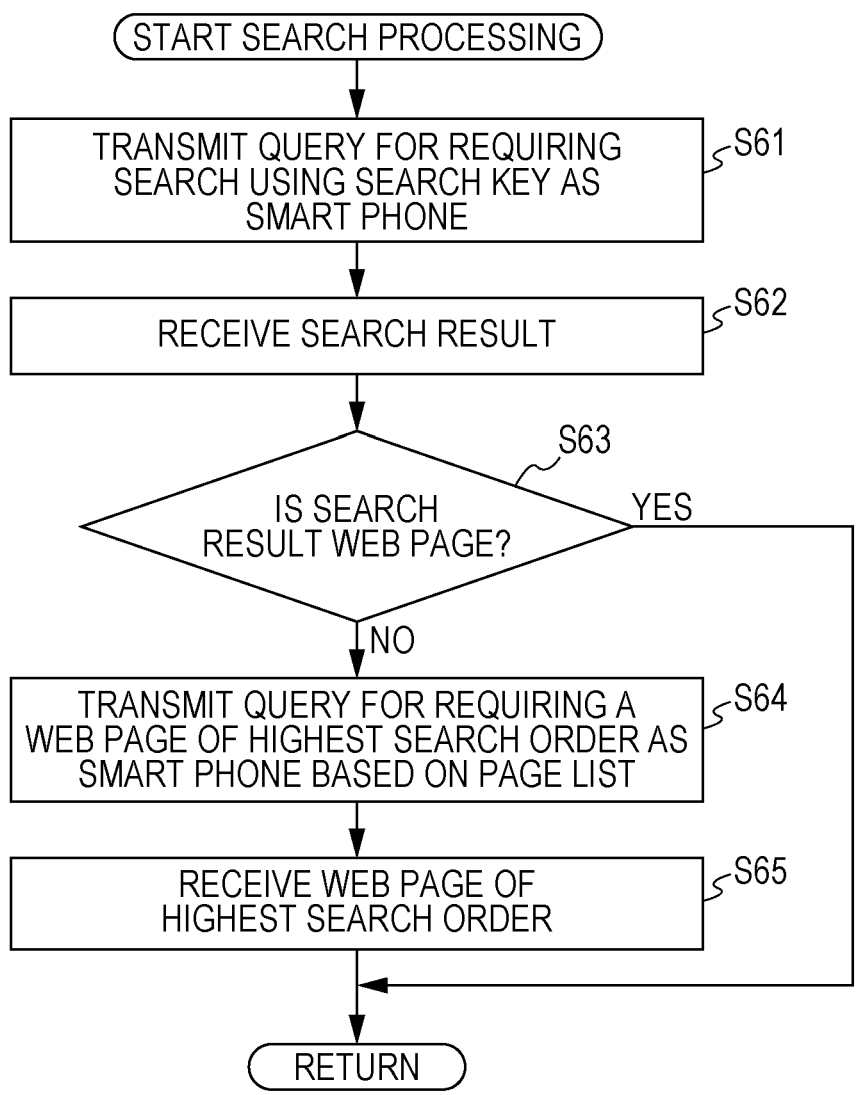
FIG. 17 is a flowchart illustrating search processing in FIG. 15.

FIG. 17 is a flowchart illustrating the search processing in Step S16 in FIG. 15.

In Step S61 in FIG. 17, the search unit 43 transmits a query for a request for the searching by using the search key to the web server 12 via the communication unit 29 as a smart phone. In Step S62, the search unit 43 receives a search result for the display on the smart phone, which is supplied from the web server 12 in response to the query, via the communication unit 29 and supplies the search result to the display control unit 42.

In Step S63, the search unit 43 determines whether or not the received search result is a web page. If it is determined in Step S63 that the search result is not a web page, that is, if the search result is a page list, then the processing proceeds to Step S64.

In Step S64, the search unit 43 generates a query for a request for the web page as a smart phone based on page information of a web page with the highest search order included in the page list and transmits the query via the communication unit 29.

In Step S65, the search unit 43 receives the web page for the display on the smart phone with the highest search order, which is transmitted from the web server 12 in response to the query, via the communication unit 29 and supplies the web page to the display control unit 42. Then, the processing returns to Step S16 in FIG. 15 and proceeds to Step S17.

In contrast, if it is determined in Step S63 that the search result is a web page, the processing returns to Step S16 in FIG. 15 and proceeds to Step S17.

As described above, the PC 11 displays the screen 51 in the display state of the PC and displays the pop-up screen 111 (221) including the search result obtained by using at least a part of information included in the screen 51 as a search key in the display state of the smart phone. Accordingly, the screen 51 and the pop-up screen 111 (221) are displayed in different display states, and the search result can be easily viewed.

In addition, the PC 11 superimposes and displays the pop-up screen 111 (221) on the screen 51. Therefore, the user can understand the information in the screen 51 by linking the information with the search result as compared with a case where the search result is displayed alone by using a browser.

Furthermore, the search result displayed in the pop-up screen 111 (221) is a search result for the display on the smart phone, which corresponds to a smaller screen than the screen 51, and therefore, it is possible to enhance the visibility of the pop-up screen 111 (221).

In addition, since the PC 11 performs searching by using text data corresponding to a region or a position designated by the user as a search key, the user can perform the search by using information in the region or information corresponding to the position merely by designating the region or the position in the screen 51. Accordingly, the user can simply search information in the screen 51.

Although the searching is performed by the user designating a region or a position after providing instruction for the searching in the above description, the searching may be performed by the user operating the floating icon after designating the region or the position without providing an instruction for the searching.

In such a case, if the region or the position is designated by the user, the display control unit 42 applies the marker 71 to the search key and displays the floating icon 301 as shown in FIG. 18. The display position of the floating icon 301 is the same as the display position of the pop-up screen 111 (221).

That is, the floating icon 301 is displayed immediately above or immediately below the marker 71 such that the position of the end point of the search key, to which the marker 71 is applied as shown in FIG. 18, in the horizontal direction coincides with the position of the right end or the left end of the floating icon 301 in the horizontal direction. Since the floating icon 301 is displayed immediately above or immediately below the marker 71 as described above, the user who designates the region or the position can view the floating icon 301 without greatly moving the visual line in the vertical direction.

The size of the floating icon 301 is changed in accordance with the size of letters of the search key in the marker 71. However, the minimum size of the floating icon 301 is such a size that facilitates operations of a mouse, a finger, the touch pen 50, or the like as the input unit 26. In addition, the inside of the floating icon 301 has high transparency and high luminance, and the outer frame thereof has low transparency and low luminance, for example.

Although the search target is a web page stored on the web server 12 in the embodiment, dictionary data, text data, data for document creation software and table calculation software, OCR data, e-mail data, handwritten letter data, scan data of a magazine or the like, image data, and the like which are stored as local files on the storage unit 28 may be used as search targets.

In such a case, the search unit 43 performs the searching as the PC 11, acquires a search result for the display on the PC from the storage unit 28, and supplies the search result to the display control unit 42. The display control unit 42 converts the search result for the display on the PC into a search result for the display on the smart phone and performs pop-up display of the search result after the conversion in the display state of the smart phone.

Although the pop-up screen 111 (221) is a screen for the display on the smart phone in the embodiment, the pop-up screen 111 (221) is not limited to the screen for the display on the smart phone as long as the pop-up screen 111 (221) is a screen for the display on an information processing apparatus of a different type from the PC 11.

Furthermore, although the instruction for changing the search key is provided by the operation of the adjustment button 90 in the embodiment, the instruction method for changing the search key is not limited thereto. In a case where the input unit 26 is a keyboard, for example, the designated range may be changed and the search key may be changed by the user pressing a direction key while pressing a shift key.

In addition, the steps for describing the program stored on the program recording medium include processing performed in a time-series manner in the described order, of course, and the processing is not necessarily performed in the time-series manner, and processing executed in a parallel manner or an individual manner is also included.

In addition, the system in the specification means a set of a plurality of constituent elements (devices, modules (components), and the like) regardless of whether or not all the constituent elements are provided in the same case body. Therefore, both a plurality of devices which are accommodated in different case bodies and are connected via a network and a single device in a single case body accommodating a plurality of modules are systems.

Furthermore, effects in the specification were described only for an illustrative purpose and are not limited thereto, and other effects may be achieved.

In addition, the embodiments in the present disclosure are not limited to the aforementioned embodiments, and various modifications can be made without departing from the gist of the present disclosure.

For example, the present disclosure may be configured as cloud computing in which a function is shared and processed by a plurality of devices via a network.

In addition, the respective steps described in the aforementioned flowcharts may be executed by a single device or may be shared and executed by a plurality of devices.

Furthermore, when one step includes a plurality of processing steps, the plurality of processing steps including the one step may be executed by a single device or may be shared and executed by a plurality of devices.

In addition, the present disclosure can be configured as follows:

(1) An information processing apparatus including: a display control unit which displays information in a first display state of the information processing apparatus itself and displays a search result obtained by using at least a part of the information as a search key in a second display state of another information processing apparatus of a different type from the information processing apparatus itself.

(2) The information processing apparatus according to (1), further including: a search unit which performs searching as the another information processing apparatus and acquires the search result for the second display state, wherein the display control unit displays the search result for the second display state acquired by the search unit.

(3) The information processing apparatus according to (1), further including: a search unit which performs searching as the information processing apparatus itself and acquires the search result for the first display state, wherein the display control unit converts the search result for the first display state acquired by the search unit into the search result for the second display state and displays the search result.

(4) The information processing apparatus according to any one of (1) to (3), wherein the display control unit is configured to selectively display the search result and a category of the search result in the second display state.

(5) The information processing apparatus according to any one of (1) to (4), wherein the display control unit is configured not to display the search result temporarily in response to a command from a user.

(6) The information processing apparatus according to any one of (1) to (5), wherein the information processing apparatus itself is a personal computer, and wherein the another information processing apparatus is a smart phone.

(7) An information processing method including: causing an information processing apparatus to display information in a first display state of the information processing apparatus itself and display a search result obtained by using at least a part of the information as a search key in a second display state of another information processing apparatus of a different type from the information processing apparatus itself.

(8) A program which causes a computer to function as: a display control unit which displays information in a first display state of the information processing apparatus itself and displays a search result obtained by using at least a part of the information as a search key in a second display state of another information processing apparatus of a different type from the information processing apparatus itself.

It should be understood by those skilled in the art that various modifications, combinations, sub-combinations and alterations may occur depending on design requirements and other factors insofar as they are within the scope of the appended claims or the equivalents thereof.

What is claimed is:

1. A first information processing apparatus, comprising:
a display control unit configured to:
    display information based on a first display state of the first information processing apparatus;
    receive a first input that corresponds to at least a part of the information;
    display at least a first search result and the at least part of the information based on the received first input and a second display state of a second information processing apparatus,
        wherein the first search result is based on the at least part of the information that is used as a search key,
        wherein a type of the second information processing apparatus is different from a type of the first information processing apparatus; and
a search unit configured to:
    acquire, as the search key, the at least part of the information;
    acquire at least a second search result in the first display state of the first information processing apparatus based on the search key,
wherein the display control unit is further configured to convert the at least second search result in the first display state into the at least first search result in the second display state.

2. The first information processing apparatus according to claim 1, wherein the search unit is further configured to acquire the at least first search result based on the search key.

3. The first information processing apparatus according to claim 1,
wherein the display control unit is further configured to display the at least first search result in the second display state based on the conversion.

4. The first information processing apparatus according to claim 1, wherein the display control unit is further configured to display a category of the at least first search result in the second display state.

5. The first information processing apparatus according to claim 1,
wherein the first information processing apparatus is a personal computer, and
wherein the second information processing apparatus is a smart phone.

6. The first information processing apparatus according to claim 1, further comprising a communication unit configured to receive, from a server, the first search result in a search order,
wherein the search order is based on a third input.

7. The first information processing apparatus according to claim 1, further comprising a display screen, wherein the display control unit is further configured to prevent the display screen to display the at least first search result for a specific time period based on a user input.

8. An information processing method, comprising:
in a first information processing apparatus;
    displaying information based on a first display state of the first information processing apparatus;
    receiving a first input that corresponds to at least a part of the information;
    displaying at least a first search result and the at least part of the information based on the received first input and a second display state of a second information processing apparatus,
        wherein the first search result is based on the at least part of the information that is used as a search key, and
        wherein a type of the second information processing apparatus is different from a type of the first information processing apparatus;
    acquiring, as the search key, the at least part of the information;
    acquiring at least a second search result in the first display state of the first information processing apparatus based on the search key; and
    converting the at least second search result in the first display state into the at least first search result in the second display state.

9. A non-transitory computer-readable medium having stored thereon, computer-readable instructions that, when executed by a first information processing apparatus, cause the first information processing apparatus to execute operations, the operations comprising:
displaying information based on a first display state of the first information processing apparatus;
receiving a first input that corresponds to at least a part of the information;
displaying at least a first search result and the at least part of the information based on the received first input and a second display state of a second information processing apparatus,
    wherein the first search result is based on the at least part of the information that is used as a search key, and
    wherein a type of the second information processing apparatus is different from a type of the first information processing apparatus;
acquiring, as the search key, the at least part of the information;
acquiring at least a second search result in the first display state of the first information processing apparatus based on the search key; and
converting the at least second search result in the first display state into the at least first search result in the second display state.

* * * * *